United States Patent
Rolf et al.

(10) Patent No.: US 11,761,772 B2
(45) Date of Patent: Sep. 19, 2023

(54) METHOD AND APPARATUS FOR PROVIDING SPECULATIVE NAVIGATION ROUTING IN INCOMPLETE OFFLINE MAPS

(71) Applicant: HERE GLOBAL B.V., Eindhoven (NL)

(72) Inventors: Daniel Rolf, Berlin (DE); Raul Cajias, Berlin (DE)

(73) Assignee: HERE Global B.V., Eindhoven (NL)

( * ) Notice: Subject to any disclaimer, the term of this patent is extended or adjusted under 35 U.S.C. 154(b) by 112 days.

(21) Appl. No.: 16/665,986

(22) Filed: Oct. 28, 2019

(65) Prior Publication Data
US 2021/0123752 A1  Apr. 29, 2021

(51) Int. Cl.
*G01C 21/34* (2006.01)

(52) U.S. Cl.
CPC ..... *G01C 21/3446* (2013.01); *G01C 21/3453* (2013.01)

(58) Field of Classification Search
CPC .......................... G01C 21/3446; G01C 21/3885
See application file for complete search history.

(56) References Cited

U.S. PATENT DOCUMENTS

| | | | | |
|---|---|---|---|---|
| 5,938,720 A | * | 8/1999 | Tamai | G01C 21/3446 701/411 |
| 8,983,778 B2 | | 3/2015 | Mccarthy et al. | |
| 9,019,173 B2 | | 4/2015 | Bast et al. | |
| 2007/0106465 A1 | * | 5/2007 | Adam | G08G 1/096883 701/533 |
| 2013/0211705 A1 | * | 8/2013 | Geelen | G01C 21/34 701/410 |
| 2015/0073708 A1 | * | 3/2015 | Mishra | G01C 21/3492 701/533 |
| 2015/0228191 A1 | * | 8/2015 | Steinmetz | G08G 1/0968 340/988 |
| 2015/0356759 A1 | | 12/2015 | Delling et al. | |

(Continued)

OTHER PUBLICATIONS

Anonymous, "Offline Routing", retrieved on Sep. 10, 2019 from https://docs.mapbox.com/android/navigation/overview/offline-routing/ , pp. 1-10.

(Continued)

*Primary Examiner* — Khoi H Tran
*Assistant Examiner* — Tristan J Greiner
(74) *Attorney, Agent, or Firm* — DITTHAVONG, STEINER & MLOTKOWSKI

(57) ABSTRACT

An approach is provided for speculative navigation routing in incomplete maps. The approach involves, for example, generating an offline navigation route to a destination using offline map data cached at a device. The approach also involves transmitting a routing request to a routing server for an online navigation route to the destination. The approach further involves providing the online navigation route or a portion of the online navigation route based on determining that the online navigation route or the portion of the online navigation is received within a timeout period. The approach further involves providing the offline navigation route or a portion of the offline navigation route generated during the timeout period based on determining that the online navigation route or the portion of the online navigation route is not received before the timeout period ends.

20 Claims, 10 Drawing Sheets

(56) References Cited

U.S. PATENT DOCUMENTS

2015/0369617 A1    12/2015  Ding et al.
2016/0349063 A1*   12/2016  Maurer .............. G01C 21/3626
2019/0120640 A1*    4/2019  Ho .................... G01C 21/3461
2019/0331502 A1*   10/2019  Fowe ................. G01C 21/3446
2021/0080271 A1*    3/2021  Zhang ................... G06Q 50/30

OTHER PUBLICATIONS

Anonymous, "Offline Mobile Maps & Navigation", retrieved on Sep. 10, 2019 from https://osmand.net/, pp. 1-8.
Office Action for related European Patent Application No. 20 204 406.1-1009, dated Mar. 29, 2023, 4 pages.

\* cited by examiner

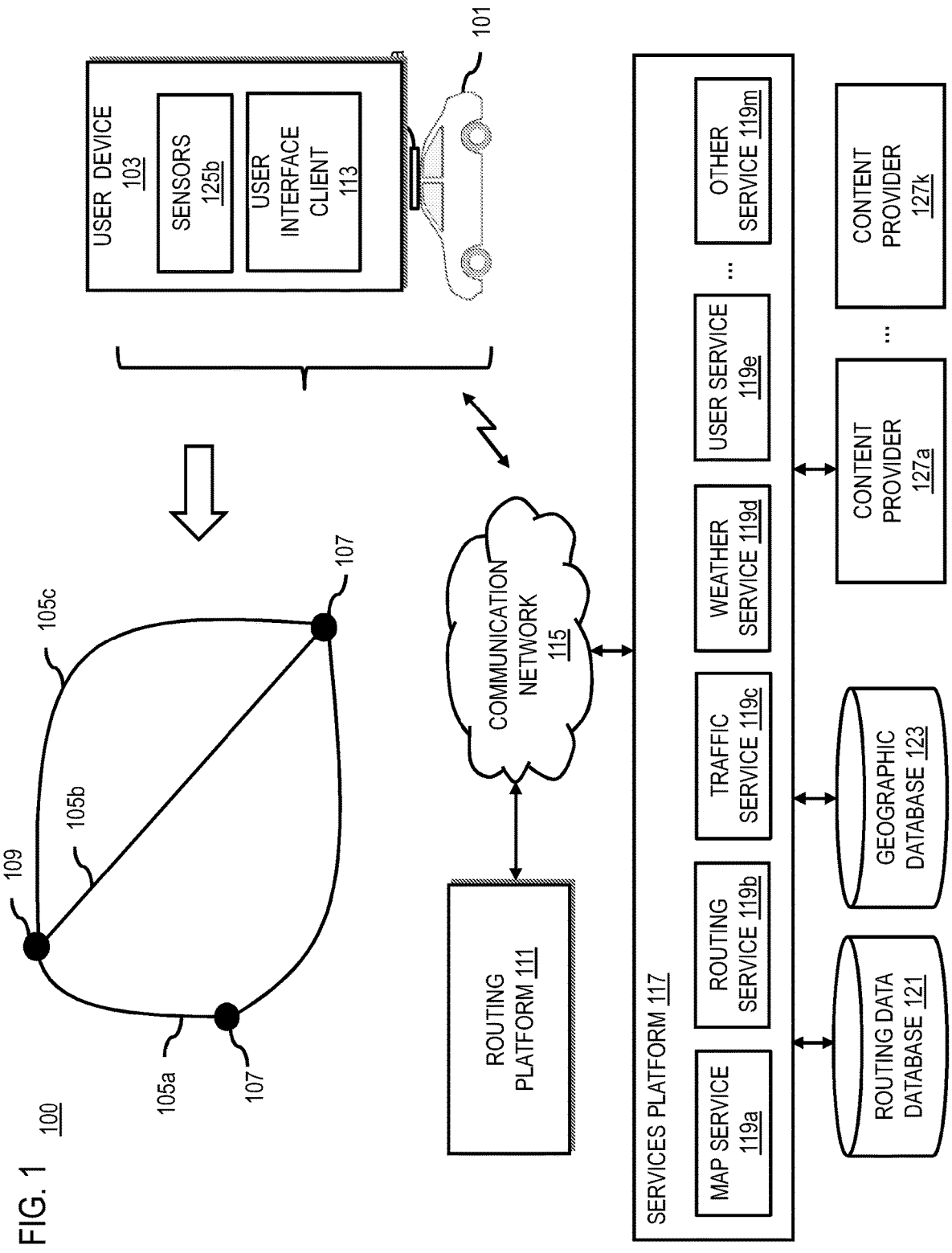

METHOD AND APPARATUS FOR PROVIDING SPECULATIVE NAVIGATION ROUTING IN INCOMPLETE OFFLINE MAPS

BACKGROUND

Navigation systems and services have enjoyed widespread acceptance and use by consumers, but service providers and developers of such systems continue to face significant technical challenges to providing navigation routing when online navigation routing becomes unavailable due to poor or disrupted data connections (e.g., blocked by urban canyons, natural canyons, etc.), etc. Falling back to offline navigation in such situations can also be problematic because offline mapping data can be incomplete (e.g., detailed map data equivalent to what is available online is not available offline at a navigation device).

SOME EXAMPLE EMBODIMENTS

Therefore, there is a need for an approach for providing speculative navigation routing to provide the best available navigation routing even when online maps are unavailable and offline maps are incomplete.

According to one embodiment, a computer-implemented method comprises generating an offline navigation route to a destination using offline map data cached at a device. The method also comprises transmitting a routing request to a routing server for an online navigation route to the destination. The one or more justification messages, for instance, are selected from among a plurality of argumentative reason classes. The method further comprises providing the online navigation route or a portion of the online navigation route based on determining that the online navigation route or the portion of the online navigation is received within a timeout period. The method further comprises providing the offline navigation route or a portion of the offline navigation route generated during the timeout period based on determining that the online navigation route or the portion of the online navigation route is not received before the timeout period ends.

According to another embodiment, an apparatus comprises a processor, and a memory including computer program code, the memory and the computer program code configured to, with the processor, cause, at least in part, the apparatus to generate an offline navigation route to a destination using offline map data cached at a device. The apparatus is also caused to transmit a routing request to a routing server for an online navigation route to the destination. The apparatus is further caused to provide the online navigation route or a portion of the online navigation route based on determining that the online navigation route or the portion of the online navigation is received within a timeout period. The apparatus is further caused to provide the offline navigation route or a portion of the offline navigation route generated during the timeout period based on determining that the online navigation route or the portion of the online navigation route is not received before the timeout period ends.

According to another embodiment, a computer-readable storage medium carries one or more sequences of one or more instructions which, when executed by one or more processors, cause, at least in part, an apparatus to generate an offline navigation route to a destination using offline map data cached at a device. The apparatus is also caused to transmit a routing request to a routing server for an online navigation route to the destination. The apparatus is further caused to provide the online navigation route or a portion of the online navigation route based on determining that the online navigation route or the portion of the online navigation is received within a timeout period. The apparatus is further caused to provide the offline navigation route or a portion of the offline navigation route generated during the timeout period based on determining that the online navigation route or the portion of the online navigation route is not received before the timeout period ends.

According to another embodiment, an apparatus comprises means for generating an offline navigation route to a destination using offline map data cached at a device. The apparatus also comprises means for transmitting a routing request to a routing server for an online navigation route to the destination. The apparatus further comprises means for providing the online navigation route or a portion of the online navigation route based on determining that the online navigation route or the portion of the online navigation is received within a timeout period. The apparatus further comprises means for providing the offline navigation route or a portion of the offline navigation route generated during the timeout period based on determining that the online navigation route or the portion of the online navigation route is not received before the timeout period ends.

In addition, for various example embodiments of the invention, the following is applicable: a method at least facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention. In one embodiment, the apparatus is further caused to present the justification message based on receiving user request following a presentation of the recommended maneuver and/or route.

For various example embodiments of the invention, the following is also applicable: a method at least facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method at least creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of providing speculative navigation routing in incomplete maps, according to one embodiment;

DESCRIPTION OF SOME EMBODIMENTS

Figure 2A:
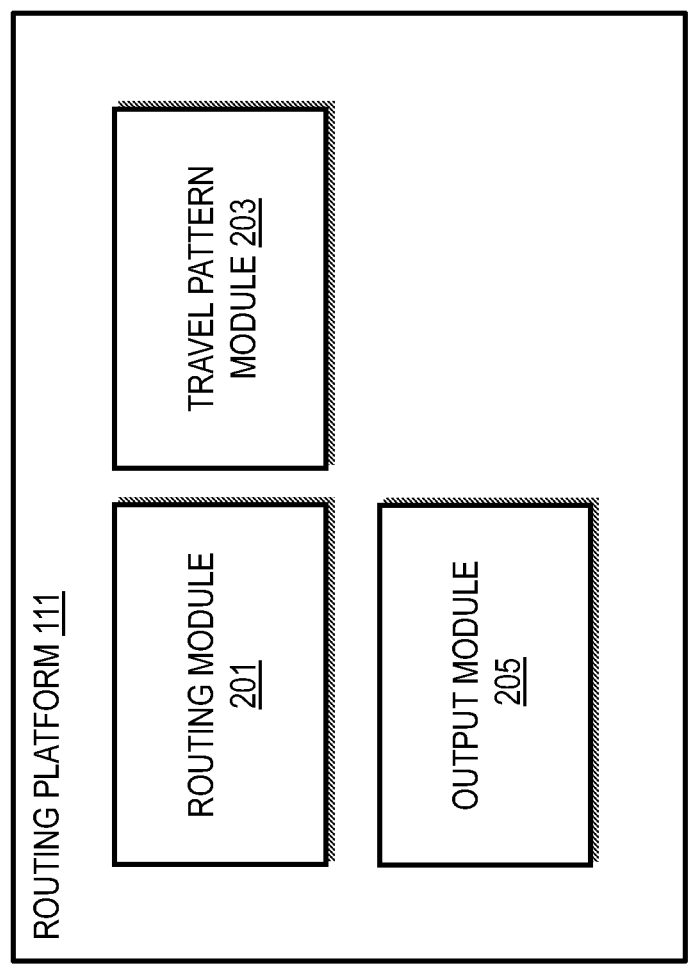
FIG. 2A is a diagram of the components of a routing platform, according to one embodiment.

Examples of a method, apparatus, and computer program for providing speculative navigation routing in incomplete maps are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system capable of providing speculative navigation routing in incomplete maps, according to one embodiment. Vehicles 101 are increasingly relying on navigation system clients 103 (e.g., a personal navigation device, smartphone, in-dash navigation device, etc.) that connect to a backend cloud (e.g., a routing platform 111) over a communication network 115 for the retrieval of map data (e.g., as stored in a geographic database 123) and routes (e.g., routes 105a-105c between an origin 107 and a destination 109). In other words, a connected navigation system client (e.g., the user device 103) is primarily designed for online use-cases by retrieving map data and routes from the cloud. However, if the vehicle 101 or user device 103 is in an area with poor network connectivity and a route needs to be computed, the online navigation system approach can fail. Examples of poor connectivity situations include but are not limited to: (1) taking a wrong turn on a freeway with poor network coverage; and (2) starting to navigate in an indoor garage with poor network coverage.

Traditionally, when online navigation routing (e.g., by a routing platform 111 in combination with a user interface client 113 executing on the user device 103 or vehicle 101) becomes unavailable, an on-board navigation system may inform the driver that computing a route is not possible ("Sorry, you are on your own!"), recommend the driver to return to the route if there was a route before ("Get back to the route!"), display an arrow on the point pointing in the direction of the destination ("270°!"), slowly try to compute a full route on a fallback offline map ("Park your car and wait a minute!"), etc. This forces the driver to guess an immediate maneuver to take, and creates a stressful user experience and leads to the driver to have less confidence in the routing guidance provided by the navigation routing service provider. Accordingly, navigation routing and mapping service providers face significant technical challenges to presenting an immediate maneuver to a driver when the online navigation routing becomes unavailable, e.g., when a network connection is not available or not desired, such as when the user device 103 is in roaming mode.

To address these technical challenges, the system 100 of FIG. 1 introduces the capability to provide the user with speculative navigation routing in incomplete maps based on a search in parallel of online and offline map data by using potentially incomplete map data at the offline navigation system (e.g., user device 103) to compute a partial route under a hard tie constraint in order to guess a first maneuver or route that is most likely right. In other words, the system 100 gives the driver of the vehicle 101 the next maneuver under a hard time constraint (e.g., timeout period) in which the system 100 attempts to compute a route using both online and offline processes in parallel and presents the first navigation result (e.g., next maneuver or route) available from either of the offline or online processes. In one embodiment of this parallel routing approach, upon determining a disruption of online processing map data (e.g., caused by poor network connectivity or unavailability of the communication network 115), the system 100 initiates the generation of an offline navigation route to a destination using offline map data cached at a device (i.e., the offline thread), while concurrently transmitting a routing request to a routing server for an online navigation route to the destination (i.e., the online thread).

In one embodiment, the system 100 uses a time constraint, such as a timeout period (e.g., 500 milliseconds) to decide which set of the thread results to present to the driver. For example, the system 100 provides an online navigation thread result when the online navigation thread result is received within the timeout period. The system 100 provides the offline navigation thread result generated during the timeout period based on determining that the online navigation thread result is not received before the timeout period ends.

In one embodiment, the system 100 provides the navigation thread result on a maneuver-by-maneuver basis. In one embodiment, the system 100 provides the navigation thread result using natural guidance where route guidance instructions contain contextual elements around a decision point. These contextual elements may include services, cartographic features, traffic signals, and stop signs. Some examples of natural guidance instructions include: "Go past the park on your right, then turn left at Anderson school on Bayview street," "Go through the traffic light and turn right before the petrol station," "Continue on your route passing the dome building on your right," etc. Such natural guidance instructions may be rendered via audio and/or visual user interface, using an appropriate language based on the user context. For example, the native language of the user is selected by the user and/or the system 100 based on the user profile. As another example, the local language is selected by the user and/or the system 100 based on a current location.

Regarding the offline thread, even without an active data connection, navigation applications developed for the user device 103 or the vehicle 101 are able to generate routing information based on offline map data to assist traveling from one location (e.g., a current location) to another. For example, the navigation applications use a set of APIs that allow manipulation of the map data stored on the user device 103 or the vehicle 101. In one embodiment, the navigation applications calculate a recommended maneuver and/or route based on offline map data for one or more current contexts (e.g., a length of trip, a time of day, a day of week, a purpose of trip, etc.) thereby generating the offline navigation thread result. For example, if a navigation application has downloaded offline maps of California and Oregon, a route from San Diego to Portland can be created without any data connection.

In one embodiment, the navigation applications construct a directed graph from the offline map data. The directed graph includes a plurality of vertices representing a plurality of road segments stored in the offline map data, and a plurality of edges connecting the plurality of road segments where a navigation maneuver is possible. The navigation applications then iteratively generate one or more candidate offline navigation routes to the destination based on the directed graph during the timeout period, and select the offline navigation route from the one or more candidate offline navigation routes based on a cost function based on shortest time, shortest distance, less computation resources, etc. The cost function can be a time-based cost model for a traversal of the plurality of edges in the directed graph. The time-based cost model is based on a first time for traversing a first road segment and a second time for traversing a second road segment.

The recommended maneuver and/or route may involve one or more maneuver. A maneuver represents the action required to go from one segment to the next within a calculated route. In one embodiment, each maneuver object includes information such as: a location of the maneuver, an action required to complete the maneuver, a distance between maneuvers, a current road, a next road, an estimated time of the maneuver, one or more signposts (if any) indicating entrance, exit, or merge information.

The navigation applications can pre-download or download on demand maps, map tiles, and/or database information for routing while offline. In one embodiment, the map data is downloaded to cache in the user device 103 or the vehicle 101 based on one or more criteria, such as when a user pans the map and triggers an on-demand map data download to render the map. For example, the navigation applications are set to display custom raster tiles, then tiles are displayed when users view a designated geographical area at a specified zoom level or range of zoom levels.

In another embodiment, the map data is preloaded in the form of map packages for a predefined region or country to store in the memory and is only limited by the amount of free memory space on the user device 103 or the vehicle 101. By way of example, the map data packages available for download are represented as a tree structure with the root map package representing the world map. For example, a map package may be a state (such as California), region (such as Yellow Stone National Park), or a country (such as Belgium). As another example, where a patch is not available (such as updating from Q2 2018 to Q3 2019), the navigation applications update the offline map data to the latest version results in the removal of all downloaded map data (whether downloaded on-demand or by specifying a bounding box/route) and loading the full map package from Q3 2019 map data release. Map packages include several groups each of which contains a different type of map data. Some of these groups may be selected or deselected before map packages are downloaded for offline use depending on the needs of different applications.

In yet another embodiment, the map data is fetched for an arbitrary bounding box or a radius around a route and cached in the user device 103 or the vehicle 101. By way of example, the navigation applications fetch map data by specifying a bounding box or a radius around a route into a persistent cache (e.g., with a default size of 256 MB) to enable offline map capabilities. This can be done through a map data prefetcher widget or application. The map data prefetcher widget or application estimates the size of fetches (e.g., in KB), initiate fetches, cancel fetches, and clear the map data cache.

Map data so fetched can be updated to the latest version using map loading application programming interfaces (APIs), to keep the map version of the system up to date. Map data version should be consistent for all map data across the entire system whether the map data is downloaded or not. In one embodiment, the navigation applications perform incremental updates, e.g., updating to the latest map data release from the two previous releases. Incremental updates are typically small downloads of map data changes only. For example, when updating to the Q3 2019 map data release from the Q1 2019 or Q2 2019 map data release, the navigation applications use an incremental update or patch.

In one embodiment, the offline map data includes a basic map used for rendering (e.g., on the user device 103 or the vehicle 101). In another embodiment, the offline map data includes a basic map used for map-matching (e.g., to a road network). In yet another embodiment, the offline map data includes a set of routes driven (e.g., by the vehicle 101 and/or a plurality of vehicles) in the past and aggregated into a basic map.

It is possible that there is no sufficient map data has been downloaded to enable all offline operations, such as offline search or routing. In one embodiment, the offline map data may be incomplete and potentially broken. The offline map data is less complete, is a less current version, or a combination thereof than online map data used by the routing server to generate the online navigation route. For example, the offline map data includes tiles downloaded from different versions of the map.

In one embodiment, the offline navigation thread result includes one or more driving maneuvers as set by the driver and/or the system 100. By way of example, the driver sets the offline navigation thread result as per turn, per zip code, per display page size, per route number, etc. In another embodiment, the offline navigation thread result includes all driving maneuvers to the destination, to a drop off location (e.g., a daycare center), to a pickup location (e.g., a pharmacy), to a point of interest (e.g., an ATM machine, a gasoline station, etc.), etc.

Regarding the online thread, the system 100 integrates the routing platform 111 over a communication network 115 with a services platform 117 to provide speculative navigation routing in incomplete maps. The services platform 117 can include one or more services 119a-119m (also collectively referred as services 119) that can provide real-time map data and/or user mobility data (e.g., as stored in a routing data database 121) for calculating a recommended maneuver and/or route for a current context thereby generating the online navigation thread result. In one embodiment, the online navigation thread result includes one or more driving maneuvers as set by the driver and/or the system 100. By way of example, the driver sets the online navigation thread result as per turn, per zip code, per display page size, per route number, etc. In another embodiment, the online navigation thread result includes all driving maneuvers to the destination, to a drop off location (e.g., a post office), to a pickup location (e.g., a daycare center), to a point of interest (e.g., a supermarket, a restaurant, etc.), etc.

By way of example, the services 119 can include but are not limited to a map service 119a that provides a geographic database 123 for routing, a routing service 119b for generating navigation routes using any routing engine known in the art, a traffic service 119c for providing real-time and/or historic travel data along potential routes, a weather service 119d for providing real-time and/or historic weather data along potential routes, a user service 119e for providing personalized user data and/or preferences for routing, and/or other related or available service 119m than can interface with the routing platform 111 to provide speculative navigation routing in incomplete maps according to the embodiments described herein.

The online navigation maneuver and/or route may involve rerouting. In one embodiment, the system 100 executes a basic route recalculation by checking the current position to see if it is on the route and approaching the destination. If it is not, then the system 100 triggers a route recalculation and updates the navigation instructions. In another embodiment, the system 100 executes a dynamic traffic reroute, which can be enabled by default. In this mode, the system 100 requests a traffic-aware route recalculation via the network from the server. In yet another embodiment, the system 100 executes a manual traffic reroute, which can be optionally enabled. In this mode, the system 100 requests a traffic-aware route recalculation from the server while notifying the client before using the new route.

The system 100 recommends/presents online or offline driving maneuvers and/or route based on the timeout. The advantages of the various embodiments for parallel routing include providing the driver the next maneuver that is most likely right under a hard time constraint ("Get me out of here!"), using potentially incomplete offline map data to compute at least a partial route under a hard time constraint. In some scenarios, the system 100 may provide a probably suboptimal maneuver under the hard time constraint, which is better than leaving the driver in uncertainty and thus "blind flight", thus probably resulting in panic and with higher risk of causing an accident. As the worst scenario, the offline route to the destination is taking a completely different path and the first maneuver is leading into the wrong direction. Even so, such a legal maneuver can always be corrected with a new route after the first maneuver leading to the destination. In addition, under volatile traffic conditions, the system 100 can change the offline route at any time point after the first or subsequent offline maneuvers later the maneuver(s) is determined as suboptimal/wrong. As a result, the users will arrive at their destinations regardless of data interruptions, and perceive uninterrupted navigation experience.

FIG. 2A is a diagram of the components of a routing platform, according to one embodiment. As shown in FIG. 2A, the routing platform 111 includes one or more components for providing speculative navigation routing in incomplete maps according to the various embodiments described herein. It is contemplated that the functions of these components may be combined or performed by other components of equivalent functionality. In this embodiment, the routing platform 111 includes a routing module 201, travel pattern module 203, and output module 205. The above presented modules and components of the routing platform 111 can be implemented in hardware, firmware, software, or a combination thereof.

Figure 2B:
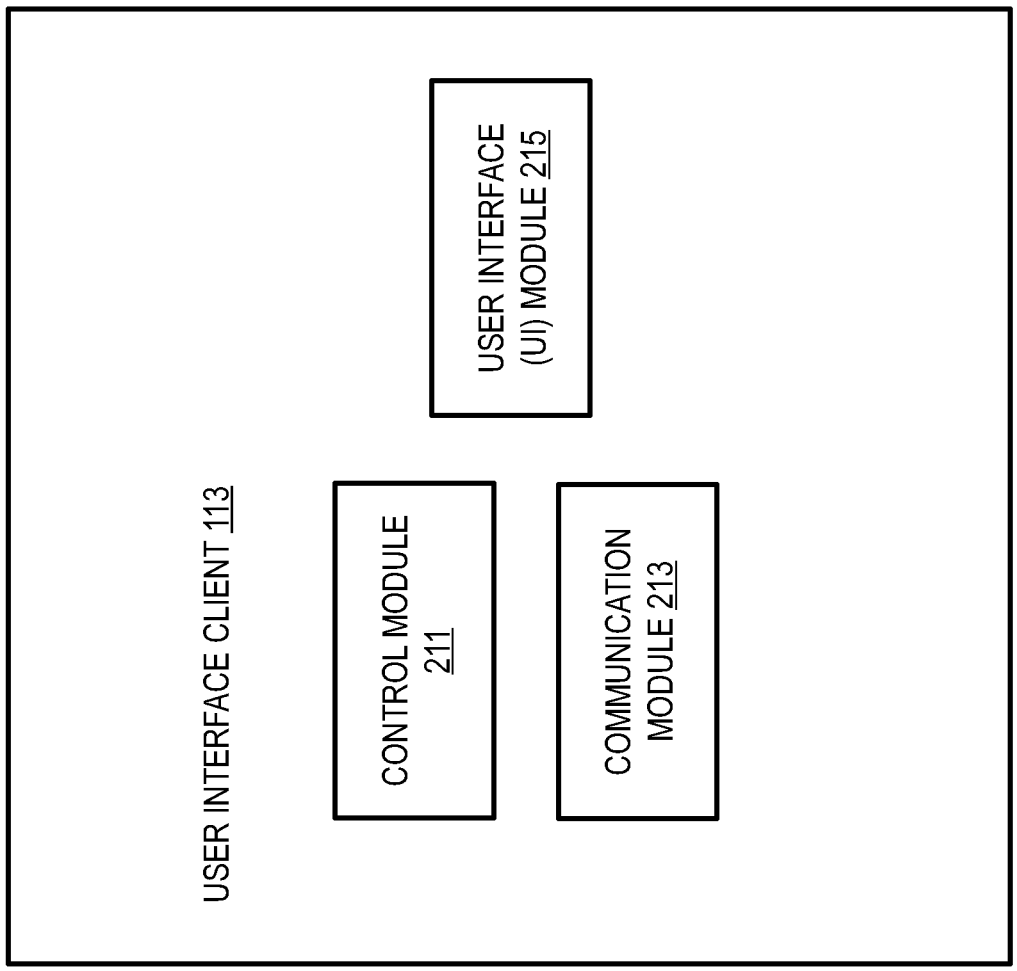
FIG. 2B is a diagram of the components of a user interface client, according to one embodiment.

FIG. 2B is a diagram of the components of a user interface client, according to one embodiment. As shown in FIG. 2B, the user interface client 113 includes one or more components for providing speculative navigation routing in incomplete maps according to the various embodiments described herein. It is contemplated that the functions of these components may be combined or performed by other components of equivalent functionality. In this embodiment, includes a control module 211, a communication module 213, and a user interface (UI) module 215. The above presented modules and components of the user interface client 113 can be implemented in hardware, firmware, software, or a combination thereof.

In one embodiment, the user interface client 113 interacts with the routing platform 111 in a client-server relationship for providing speculative navigation routing in incomplete maps. More specifically, in one embodiment, for providing speculative navigation routing in incomplete maps may be used to render a user interface that includes a recommended maneuver and/or route with one or more selectable user interface elements of various styles, moods, etc. and respective transition parameters (e.g., timing length, tempo, etc.).

Though depicted as separate entities in FIG. 1, it is contemplated that the routing platform 111 and/or the user interface client 113 may be implemented as a module of any other component of the system 100 (e.g., a component of the services platform 117, any of the services 119, vehicle 101, user device 103, user interface client 113 executing on the user device 103, etc.). In another embodiment, one or more of the modules 201-205 may be implemented as a cloud-based service, local service, native application, or combination thereof. The functions of the routing platform 111 and the modules 201-205, as well as the user interface client 113 and/or any of the modules 211-215 of the user interface client 113 are discussed with respect to FIGS. 3-5 below.

Figure 3:
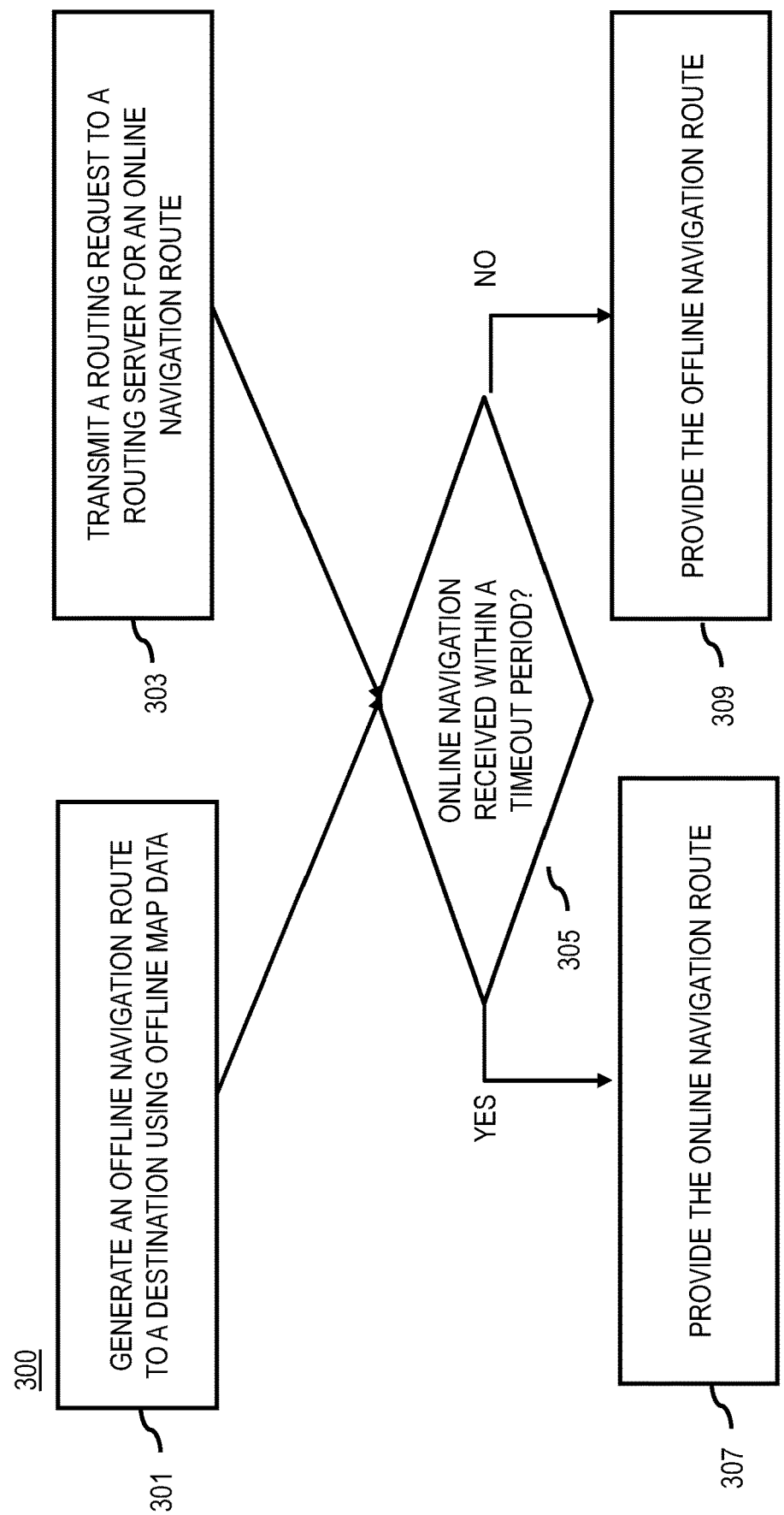
FIG. 3 is a flowchart of a process for providing speculative navigation routing in incomplete maps, according to one embodiment.
Figure 8:
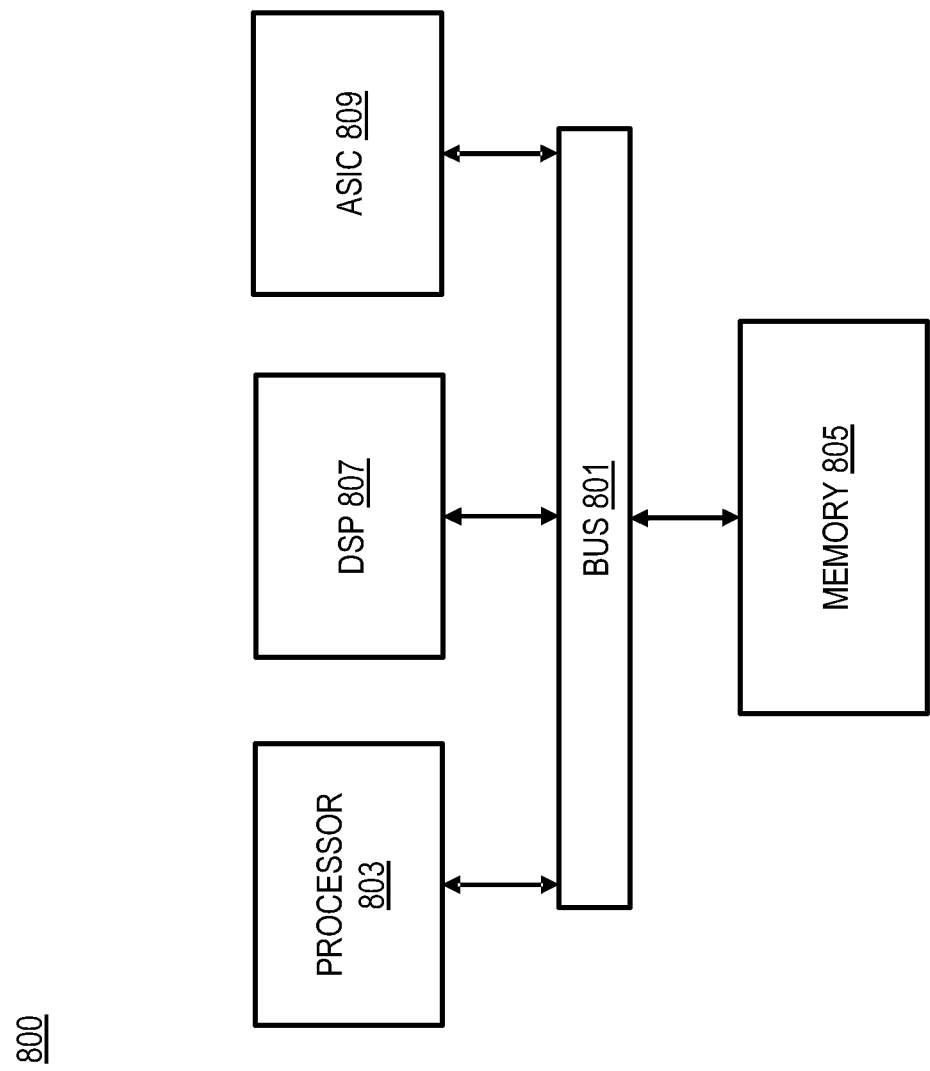
FIG. 8 is a diagram of a chip set that can be used to implement an embodiment.

FIG. 3 is a flowchart of a process for providing speculative navigation routing in incomplete maps, according to one embodiment. In various embodiments, the routing platform 111 and/or any of the modules 201-205 of the routing platform 111, as well as the user interface client 113 and/or any of the modules 211-215 of the user interface client 113 may perform one or more portions of the process 300 and may be implemented in, for instance, a chip set including a processor and a memory as shown in FIG. 8. As such, the routing platform 111 and/or the modules 201-205, as well as the user interface client 113 and/or any of the modules 211-215 of the user interface client 113 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, a user interacts with the user interface client 113 to specify a destination and requests for a navigation route. In some embodiments, the user interface client 113 infers a destination and a request for a navigation route to the inferred destination based on historical mobility data (e.g., data on previously traveled routes, when those routes were traveled, under what conditions those routes were traveled, etc.) and/or other contextual data (e.g., calendar information, engaged activity, purpose of the trip, etc.). In step 301, upon detecting an interruption of online map data and/or navigation instructions for a destination, the control module 211 of the user interface client 113 generates an offline navigation route to the destination using offline map data cached at a device.

In step 303, simultaneously or substantiality simultaneously, the communication module 213 of the user interface client 113 transmits a routing request to a routing server (e.g., associated with the routing platform 111 or other navigation services) for an online navigation route to the destination. There can be many different start use-cases. For example, the driver selects a destination TARGET and wants to start navigating. As another Example, the driver is driving along a route to a destination TARGET, but just deviates from the current route.

In one embodiment, the output module 205 of the routing platform 111 transmits most current online map data to the user interface client 113 to generate recommended and alternative routes and/or navigation routing instructions locally. In another embodiment, the routing module 201 of the routing platform 111 determines or identifies recommended maneuver and/or route using a routing engine. In yet another embodiment, the routing module 201 additionally determines or identifies alternatives to the recommended maneuver and/or route using the routing engine, retrieving previously driven routes, etc. In one embodiment, the alternative route can be any other route or routes to the user's destination that can be compared with the recommended maneuver and/or route. The routing module 201 can use any routing engine known in the art to generate a recommended maneuver and/or route based on current routing data. Current routing data refers to real-time data that is used to recommend a route based on the cost function (e.g., function based on minimizing travel distance, travel time, use of certain road types, etc.) used by the applied routing engine and/or selected by the user. The output module 205 of the routing platform 111 transmits recommended route, alternative routes, and/or navigation routing instructions to the user interface client 113.

In step 305, the control module 211 of the user interface client 113 determines whether the online navigation route or the portion of the online navigation is received within a timeout period. For example, the portion of the online navigation is a first online maneuver. Since the user interface client 113 needs to quickly give instructions to the driver for the next maneuver, there is a time constraint of TIMEOUT after the user interface client 113 should present voice and/or visual instructions to the driver. For example, the TIMEOUT could be as short as 500 ms. Then after, an online or offline recommended maneuver and/or route can be presented to the user via a user interface (e.g., a voice-based, visual, audio, etc. user interface) to begin providing navigation routing according to the embodiments described herein.

In step 307, the UI module 215 of the user interface client 113 provides the online navigation route or the portion of the online navigation route when the control module 211 determines that the online navigation route or the portion of the online navigation is received within the timeout period.

In step 309, the UI module 215 of the user interface client 113 provides the offline navigation route or a portion of the offline navigation route generated during the timeout period when the control module 211 determines that the online navigation route or the portion of the online navigation route is not received before the timeout period ends. For example, the portion of the offline navigation is a first offline maneuver.

The process 300 provides a race between online routing and GUESS_MANEUVER. GUESS_MANEUVER given a timeout to respond. Therefore, whatever wins the race will yield the first maneuver to the process 300. By way of example, the control module 211 knows its current location on the map given as START. The control module 211 executes a process 300 defined in Table 1.

TABLE 1

In parallel:
   THREAD 1:
      Make a routing request from START to TARGET to the routing server in the cloud
      Wait and receive the route ROUTE from the server
      Yield the first maneuver of ROUTE
   THREAD 2:
      Execute FIRST_MANEUVER = GUESS_MANEUVER(START, TARGET, TIMEOUT)
      Yield FIRST_MANEUVER
Wait until either THREAD1 or THREAD2 yielded the first maneuver
Present guidance instructions to the driver:
   Voice commands for the first maneuver (e.g., "turn left")
   Visual instructions for the first maneuver (e.g., arrow)

The control module 211 can use any routing algorithm known in the art (e.g., A* algorithm) to guess/generate a recommended maneuver and/or route based on offline map data. A* algorithm is widely used in pathfinding and graph traversal. In one embodiment, the control module 211 calculates the recommended maneuver and/or route based on a cost function (e.g., minimizing travel distance, travel time, use of certain road types, etc.) as selected by the system 100 and/or the user.

In one embodiment, the control module 211 constructs a directed graph from the offline map data. The directed graph includes a plurality of vertices representing a plurality of road segments stored in the offline map data, and a plurality of edges connecting the plurality of road segments where a navigation maneuver is possible. The control module 211 then iteratively generates one or more candidate offline navigation routes to the destination based on the directed graph during the timeout period, and selects the offline navigation route from the one or more candidate offline navigation routes based on a cost function. The cost function can be a time-based cost model for a traversal of the plurality of edges in the directed graph. The time-based cost model is based on a first time for traversing a first road segment and a second time for traversing a second road segment.

By way of example, the control module 211 executes a function (GUESS_MANEUVER) defined in Table 2, to get as close as possible to the destination given a hard time constraint.

TABLE 2

FUNCTION GUESS_MANEUVER(START, TARGET, TIMEOUT):
Construct a directed graph from the offline map data that with:
  Vertices being the road segments stored in the offline map data
  Edges connecting road segments when turns are legally possible
Define a time-based cost model for the traversal of edges in that graph, e.g.:
  The cost of traversing an edge E that connects road A and road B is given as:
    cost(E) = LENGTH(A) / SPEED_LIMIT(A) / 2 + LENGTH(B) /
    SPEED_LIMIT(B) / 2
  That means the cost is half of the time of traversing A plus half of the time of
  traversing B
Assume a maximum speed limit MAX_SPEED = 130 km/h.
Set BEST to INFINITY and BEST_ROUTE to NULL.
Start a timer T to timeout after TIMEOUT.
Run a modified A* algorithm at START with destination TARGET:
  When the algorithm visits a vertex road R, do:
    DIST = compute the distance from R to TARGET
    If DIST < BEST:
      Set BEST = DIST
      Set BEST_ROUTE to the current route from START to R as given
      by the A*
  If the timer T reached the TIMEOUT, stop the algorithm
  When expanding and edge E, the A*-heuristic is given as:
    DIST = compute the distance from E to TARGET
    Use DIST / MAX_SPEED as lower cost-bound from E to TARGET.
Return the first maneuver of BEST_ROUTE.

In another embodiment, the routing platform 111 and/or the user interface client 113 keep track of the history of user acceptances or rejections of a recommended maneuver and/or route. In some embodiments, the routing platform 111 and/or the user interface client 113 can also keep track of the history of both the routes driven by the driver and by all drivers. To establish mobility database and/or models. In addition, temporal context and/or circumstances like pouring rain, traffic jams, user mobile data running out, other real-time events can be presented as additional justifications or reasons for an offline routing maneuver and/or route.

In one embodiment, to facilitate a more conversational interaction between he user and the routing platform 111 or the user interface client 113, the routing module 201 or the control module 211 can use any name, label, symbol, icon, representation, etc. to identify the recommended and/or alternative routes.

After identifying one or more recommended maneuver and/or route, the user interface client 113 can present one or more messages in support or in favor of the recommended maneuver and/or route. The user interface client 113 can create the messages according to any of a set of argumentative reason classes maintained by routing platform 111. The argumentative reason classes provide argumentative categories based on various routing issues, parameters, criteria, conditions, etc. that can be used as the basis for switching between the online navigation routing and the online navigation routing. By way of example, the argumentative reason classes can include but is not limited to an online data connection availability, an estimated time of arrival (ETA), accidents, road hazards, road closures, construction events, weather conditions, special or public events, and/or the like associated with the recommended or alternative routes. In one embodiment, the UI module 215 can present the different messages with their associated argumentative classes in a series of messages, wherein the reasons or messages are presented separately (e.g., in a conversational user interface or equivalent).

In one embodiment, the user interface client 113 can gather data for generating a message to indicate to the user why the system 100 has selected the recommended maneuver and/or route over the alternative route using any real-time or historical data source from which the argumentative reasons in favor of the recommended maneuver and/or route can be extracted. For example, the data from the services platform 117 (e.g., including a map service 119*a*, routing service 119*b*, traffic service 119*c*, weather service 119*d*, user service 119*e*, and other services 119*m*), routing data database 121, geographic database 123, etc. can be queried to evaluate the or determine the comparison parameters, criteria, issues, etc. associated with each argumentative reason classes.

In one embodiment, the data can include historical routing data comprising previously recommended maneuver and/or routes, previously traveled routes (e.g., mobility graphs by the user specifically for personalized routing or an aggregate or users for more general routing), previous contexts for the routes (e.g., traffic, weather, time of day, vehicle type, activity, etc.).

Figure 4:
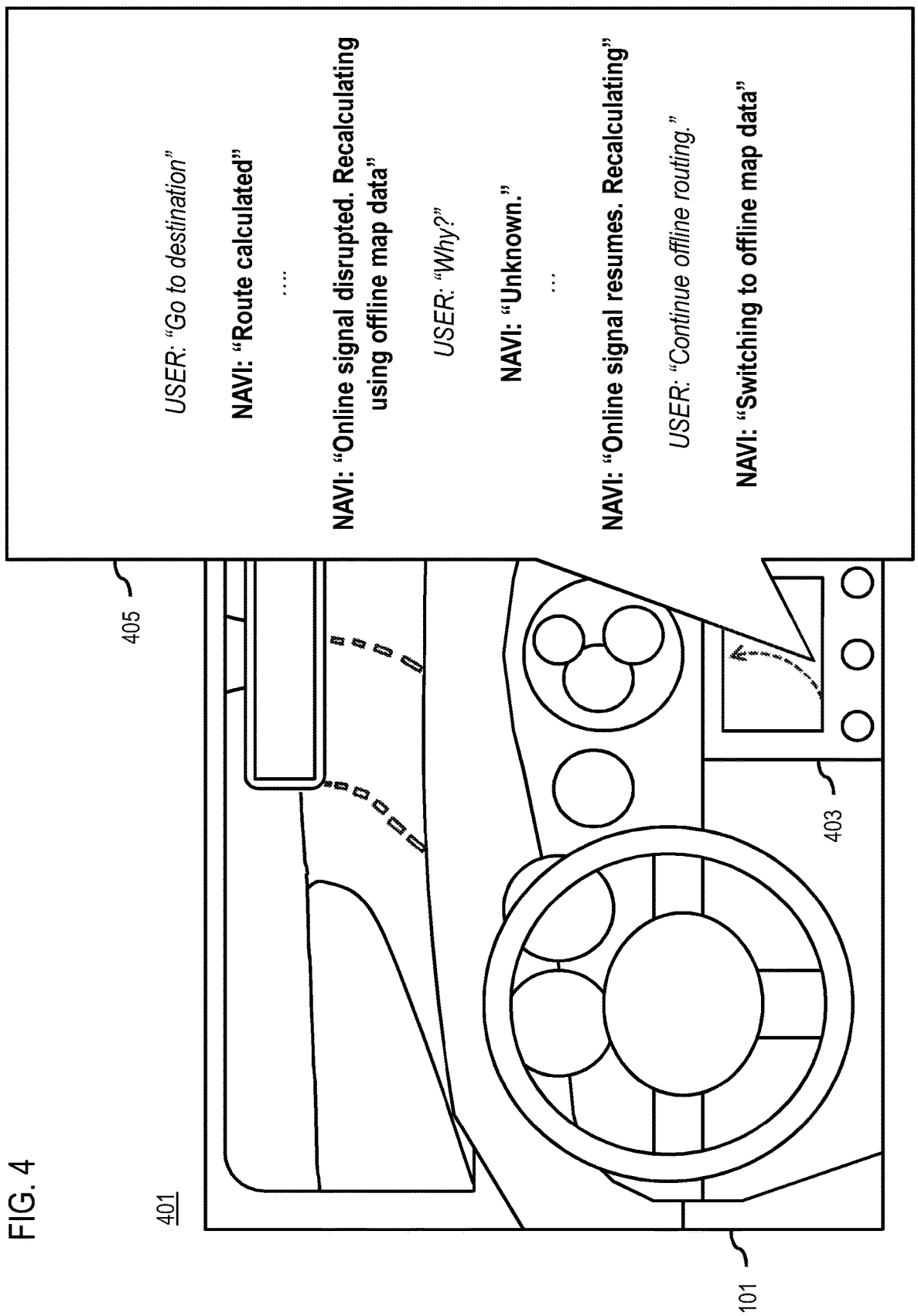
FIG. 4 is a diagram of a user interface for providing messages for speculative navigation routing in incomplete maps, according to one embodiment.

FIG. 4 is a diagram of a user interface for providing messages for speculative navigation routing in incomplete maps, according to one embodiment. As shown in FIG. 4, the travel pattern module 203 of the routing platform 111 or the control module 211 can create "justifications" or "reasons" in favor of a route under any of the argumentative reason classes by using historic traffic information or routing data to compare if there is a deviation from previous route performances (e.g., routes that were previously traveled or recommended). For example, the travel pattern module 203 or the control module 211 determines a travel pattern for the recommended maneuver and/or route based on routing data (e.g., as stored in the routing data database 121). For example, the historical routing data can be used to determine the average historical estimated time of arrival (ETA), average historical travel distance, historical contexts (e.g., traffic, incidents, weather, etc.), and/or any other related historical routing parameter to indicate or represent the historical travel patterns for the recommended maneuver and/or route. In one embodiment, the historical contextual data can also or instead be provided by the services platform 117 and/or any services 119 of the services platform 117. The historical travel pattern can then indicate or otherwise be based on the historical ETA, travel distance, etc. and/or the historical contextual conditions (e.g., time, weather, traffic, etc.) under which the corresponding ETA, travel distance, etc. occurred.

In one embodiment, the system 100 can also process real-time contextual data (e.g., probe trajectory data, incident reports, weather reports, etc.) from road links comprising the recommended maneuver and/or routes and/or alternative routes to identify any potential incidents (e.g., traffic congestion, traffic incidents, etc.) that may be associated with the recommended maneuver and/or route and that may be indicative of one or more of the argumentative reason classes.

The system 100 generates messages for recommending the recommended maneuver and/or route. FIG. 4 is a diagram of an example user interface 401 for providing speculative navigation routing in incomplete maps messages, according to one embodiment. In the example of FIG. 4, a user (not shown) is a driving a vehicle 101 equipped with a navigation system 403 (e.g., in conjunction with the user interface client 113 or equivalent) capable of providing speculative navigation routing in incomplete maps according to the embodiments described herein. The navigation system 403 provides a conversational voice-based user interface, and the dialog box 405 provides text to indicate exemplary interactions between the user (e.g., indicated in the dialog box 405 by the label "User" and italicized text) and the navigation system 403 (e.g., indicated in the dialog box 405 by the label "Navi" and bolded text).

Figure 5:
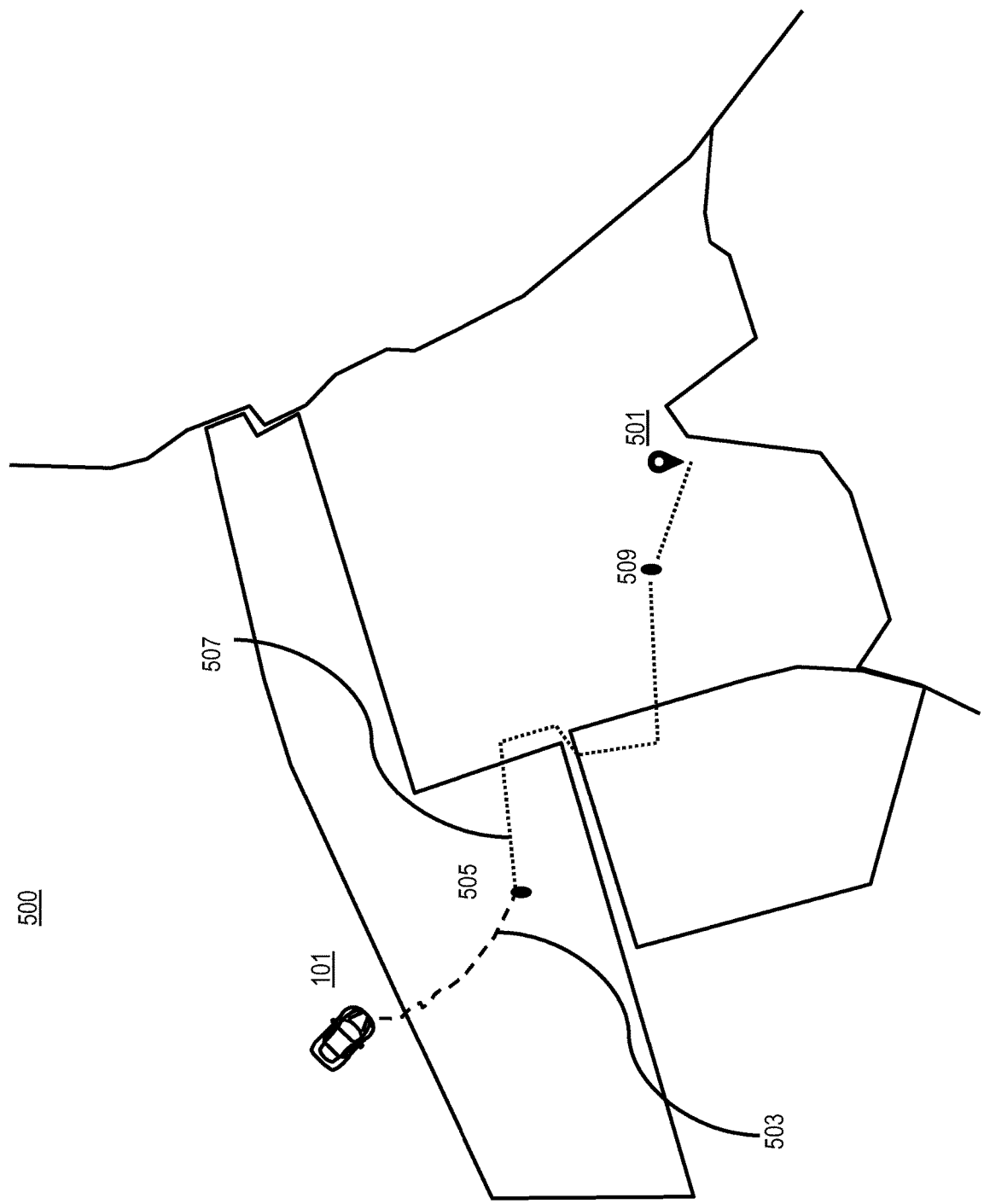
FIG. 5 is a diagram of a user interface for providing an online route and an offline route, according to one embodiment.

FIG. 5 is a diagram of a user interface 500 for providing an online route and an offline route, according to one embodiment. The user begins by requesting that the navigation system 403 to calculate a route to a specified destination 501 (e.g., User issues a voice command: "Go to destination").

The navigation system 403 parses the destination 501 from the user's speech input (e.g., using a voice recognition system), calculates a route 503 from the current location of the vehicle 101 to the destination using a fastest route routing algorithm based on online map data, and responds with a message indicating "Route calculated". In this example, the navigation system 403 has mapped the respective route to provide a route name. When the online navigation data connection is interrupted near a location 505 on route 503, the navigation system 403 generates a message indicating "Online signal disrupted. Recalculating using offline map data," and generate a route 507. The user then utters a voice command: "Why?", and the navigation system 403 generates a message indicating "Unknown." In other embodiments, the navigation system 403 generates a message indicating an ETA, accidents, road hazards, closures, construction, weather conditions, public events that affect traffic flow, etc.

When the online navigation data connection resumes near a location 509 on the route 507, the navigation system 403 generates a message indicating "Online signal resumes. Recalculating," and plans to continue back to the route 503. However, the user immediately utters a voice command: "Continue offline routing", and the navigation system 403 generates a message indicating "Switching to offline map data," and plans to continue the route 507. After each message presented the user, the control module 211 determines whether the user accepted or not accepted the current navigation thread based on user interactions (e.g., voice response) and/or user actions (e.g., maneuver and/or route actually taken), and then responds to the user accordingly.

Returning to FIG. 1, as described above, the system 100 includes a routing platform 111 to perform the functions associated with providing speculative navigation routing in incomplete maps according to the embodiments described herein. The system 100 also includes one or more vehicles 101 and/or user devices 103 with connectivity to the routing platform 111 over a communication network 115. In one embodiment, the vehicles 101 and/or user devices 103 are or may include navigation systems or other devices (e.g., mobile devices) capable of executing user interface clients 113 configured to perform route calculation and provide speculative navigation routing in incomplete maps as described according to the various embodiments discussed herein. In one embodiment, the vehicles 101 and/or user devices 103 can act independently or as clients of the routing platform 111 to perform route calculation and provide speculative navigation routing in incomplete maps. In addition, the vehicles 101, user devices 103, and/or user interface clients 113 can perform all or a portion of the functions of the routing platform 111.

In one embodiment, a user can request, via the user device 103, a navigation route from a first location (e.g., location A) to a second location (e.g., location B). These two locations may be any two locations between an initial departure location and a final destination location with zero to many stopover locations, including the departure and destination locations. The routing platform 111 then uses at least one routing engine or algorithm to calculate an initial or baseline route from location A to location B with zero to many intermediate waypoints. By way of example, the routing engine or algorithm is any traditional routing engine or algorithm known in the art that is capable of generating a route according to at least one specific definition or cost function parameter of what is an optimal route such as a shortest or fastest route.

In one embodiment, the vehicles 101 and/or user devices 103 may include or have access to respective sensors 125a and 125b (also collectively referred to as sensors 125). By way of example, the sensors 125 may include various sensors for determining location and/or geospatial information to support the functions of the routing platform 111 and/or any other navigation system such as routing and mapping. The vehicles 101 and/or user devices 103 may utilize sensors 125 such as GPS or other satellite-based location receivers for determining geospatial or location information. The sensors 125 may also be used to perform cellular triangulation, assisted-GPS, or other location-based techniques for determining the geographic coordinates of a user device 103. In addition, the sensors 125 may be used to gather temporal, spatial or environmental information regarding the user devices 103 and/or the roadways/intersections on which the user devices 103 are traveling. By way of example, the sensors may detect speed and location data, tilt data (e.g., a degree of incline or decline of the vehicle along a path of travel), motion data, light data, sound data, image data, weather data and the like.

Still further, the sensors 125 may detect local or transient network and/or wireless signals, such as those transmitted by nearby devices during navigation of a vehicle associated with the user. This may include, for example, network routers as configured within a premise (e.g., home or business), vehicles 101, or other user devices 103 encountered during navigation. Other signals detected may include those transmitted by traffic related objects such as traffic lights, traffic cameras, signals, digital signage or the like. It is noted that, in certain implementations, the sensors 125 of a vehicle 101 in which a user device 103 is present may be configured to interact with the sensors 125 of the user device 103 for enabling data exchange (e.g., geospatial information exchange) and interaction. This exchange may be facilitated by way of any known or still developing range based or wireless communication protocols.

As noted above, in one embodiment, the routing platform 111 performs the functions associated with providing speculative navigation routing in incomplete maps according to the embodiments described herein. In one embodiment, the system 100 includes an infrastructure for sharing geospatial information in real-time on multiple devices that includes a map-based service, application, and/or web interface that provides a typical map user interface. By way of example, a map-based service 119a, application, and/or interface can be provided over the communication network 115 by the services platform 117.

In one embodiment, the routing platform 111 may be configured to interface directly with the services platform 117 that provides various services. For example, in addition to the map service 119a (e.g., for providing mapping data and related information), the services platform 117 may include a routing service 119b (e.g., to provide a routing engine for calculating navigation routes), a traffic service 119c (e.g., to provide traffic updates and conditions along a route), a weather service 119d (e.g., to provide weather conditions along a route), a user service 119e (e.g., to enable a user to manage account information, configure personalized preferences, and engage in social interactions with other users), and/or other services 119m (also collectively referred to as services 119). In addition, the routing platform 111 and/or the services platform 117 may interface with one or more content providers 127a-127k (also collectively referred to as content providers 127) that provide/deliver content of various types and genres (e.g., geospatial information, mapping content, navigation content, travel content, locality content, marketing content) upon request. Requests may be initiated via the communication network 115 by way of one or more location-based user interface clients 113 executing on the vehicles 101 and/or user devices 103 that are associated with respective users. By way of example, the user interface clients 113 may access turn-by-turn navigation, routing information, maps, driving instructions, etc., for accessing, annotating, and/or sharing geospatial information. In one embodiment, the routing platform 111 can store and/or retrieve historical routing data and/or current or real-time routing data in the routing data database 121, and store geospatial information, annotations, and/or other related information in the geographic database 123 (further described below with respect to FIG. 6). In one embodiment, the services platform 117 and/or any of the services 119 may also have connectivity to the geographic database 123.

In one embodiment, the system 100 includes software to enhance the user interface clients 113, the services 119, the services platform 117, the content providers 127, and/or any other component of the system 100 to enable a user to utilize navigational guidance information based on routes calculated to provide speculative navigation routing in incomplete maps. In one embodiment, the system 100 can be used to augment (e.g., by automatically communicating to a user) navigational guidance with weather reports, traffic information, and other like information that may be of relevance to a user to providing speculative navigation routing in incomplete maps. In one embodiment, the geospatial information and/or related route are saved on the participating users' user devices 103 or other equivalent data such as the routing data database 121.

By way of example, navigational information includes, but is not limited to, information related to routes, public spaces (parks, libraries, etc.), geographic areas (towns, boroughs, city blocks, etc.), points-of-interest (restaurants, shopping, etc.), and other like navigational information. Such information may be gathered as navigational information or to supplement preexisting information, and may further include crowd source data, network information, public databases, public information (public transport schedules, etc.), and other like information. In one embodiment, navigational information also may include a number of forms including annotations related to route information, location, logos, visual images, acronyms, and other like forms that may indicate navigational information.

By way of example, the user device 103 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, embedded navigation system, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the user device 103 can support any type of interface to the user (such as "wearable" circuitry, etc.). In one embodiment, the user device 103 can be a vehicle or a component part of a vehicle.

By way of example, the user interface clients 113 may be any type of application that is executable at the user device 103, such as communication services (e.g., texting applications, calling applications, etc.), location-based service applications, navigation applications, camera/imaging application, media player applications, social networking applications, calendar applications, and the like. In one embodiment, one of the user interface clients 113 at the user device 103 may act as a client for the routing platform 111 and perform one or more functions of the routing platform 111. In one scenario, users are able to select a destination via one or more map applications. In one embodiment, one or more receivers of the user device 103 may process and present routes and related justification messages to provide speculative navigation routing in incomplete maps.

The communication network 115 of system 100 includes one or more networks such as a data network, a wireless network, a telephony network, or any combination thereof.

It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the components of the system 100 communicate with each other and other components using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
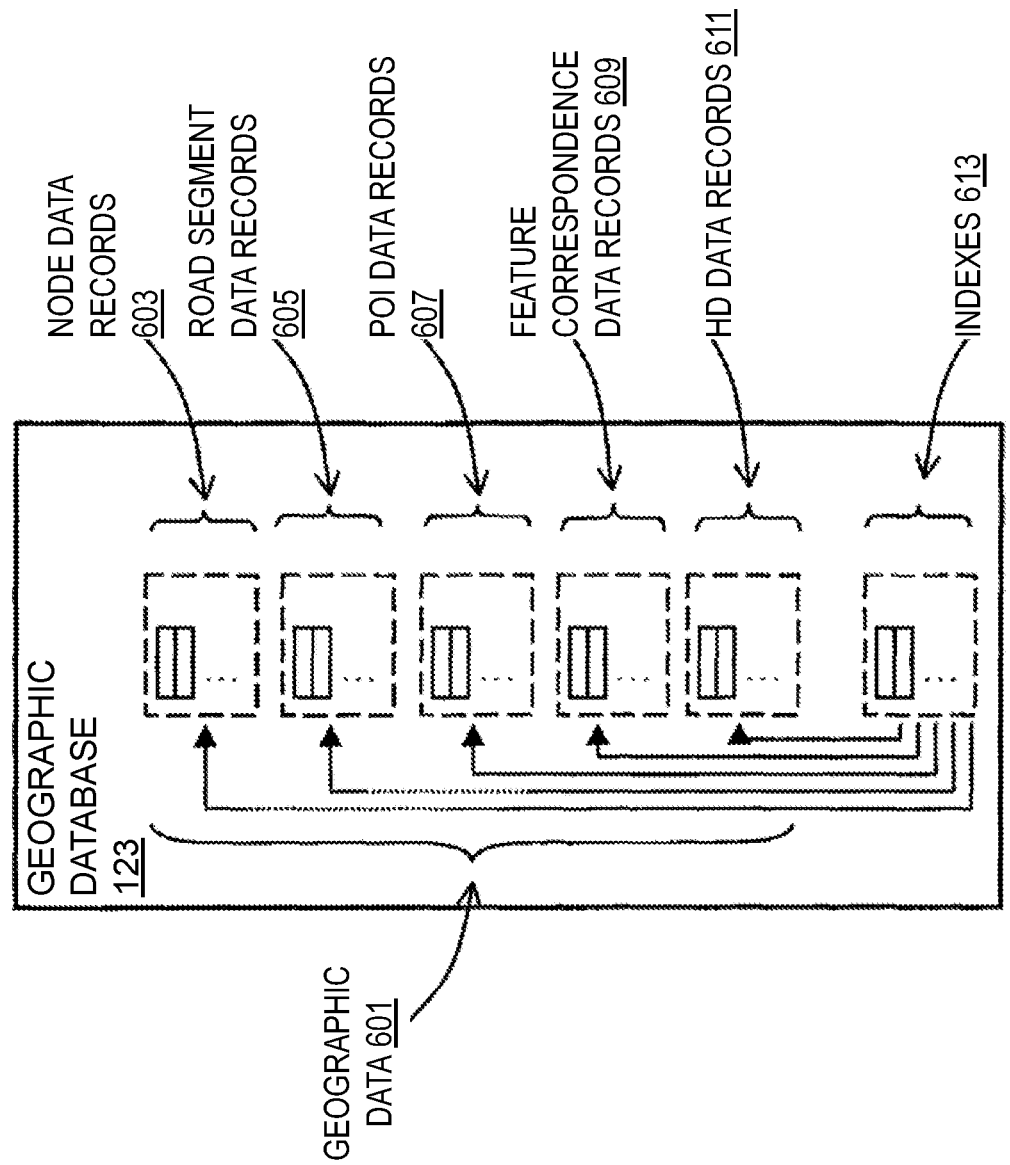
FIG. 6 is a diagram of the geographic database, according to one embodiment.

FIG. 6 is a diagram of a geographic database, according to one embodiment. In one embodiment, the geographic database 123 includes geographic data 601 used for (or configured to be compiled to be used for) mapping and/or navigation-related services, such as for video odometry based on the mapped features (e.g., lane lines, road markings, signs, etc.). In one embodiment, the geographic database 123 includes high resolution or high definition (HD) mapping data that provide centimeter-level or better accuracy of map features. For example, the geographic database 123 can be based on Light Detection and Ranging (LiDAR) or equivalent technology to collect billions of 3D points and model road surfaces and other map features down to the number lanes and their widths. In one embodiment, the HD mapping data (e.g., HD data records 611) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 603, road segment or link data records 605, POI data records 607, parallel routing records 609, HD mapping data records 611, and indexes 613, for example. More, fewer or different data records can be provided. In one embodiment, additional data records (not shown) can include cartographic ("carto") data records, routing data, and maneuver data. In one embodiment, the indexes 613 may improve the speed of data retrieval operations in the geographic database 123. In one embodiment, the indexes 613 may be used to quickly locate data without having to search every row in the geographic database 123 every time it is accessed. For example, in one embodiment, the indexes 613 can be a spatial index of the polygon points associated with stored feature polygons.

In exemplary embodiments, the road segment data records 605 are links or segments representing roads, streets, or paths, as can be used in the calculated route or recorded route information for speculative navigation routing in incomplete maps. The node data records 603 are end points corresponding to the respective links or segments of the road segment data records 605. The road link data records 605 and the node data records 603 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 607. The geographic database 123 can also include data about places, such as cities, towns, or other communities, and other geographic features, such as bodies of water, mountain ranges, etc. Such place or feature data can be part of the POI data records 607 or can be associated with POIs or POI data records 607 (such as a data point used for displaying or representing a position of a city).

In one embodiment, the geographic database 123 can include parallel routing records 609 for storing routing switch messages, deviation data, and/or any other related data associated with providing speculative navigation routing in incomplete maps. In this way, generated routing switch messages, deviations, etc. can be retrieved and used for providing speculative navigation routing in incomplete maps according to the embodiments described herein.

By way of example, the parallel routing records 609 can be associated with one or more of the node records 603, road segment records 605, and/or POI data records 607 to support localization or visual odometry based on the features stored therein and the corresponding speculative navigation routing in incomplete maps. In this way, the records 609 can also be associated with or used to classify the characteristics or metadata of the corresponding records 603, 605, and/or 607.

In one embodiment, as discussed above, the HD mapping data records 611 model road surfaces and other map features to centimeter-level or better accuracy. The HD mapping data records 611 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 611 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 611 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 611.

In one embodiment, the HD mapping data records 611 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 125 in association with the services platform 113 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 107) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for speculative navigation routing in incomplete maps may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
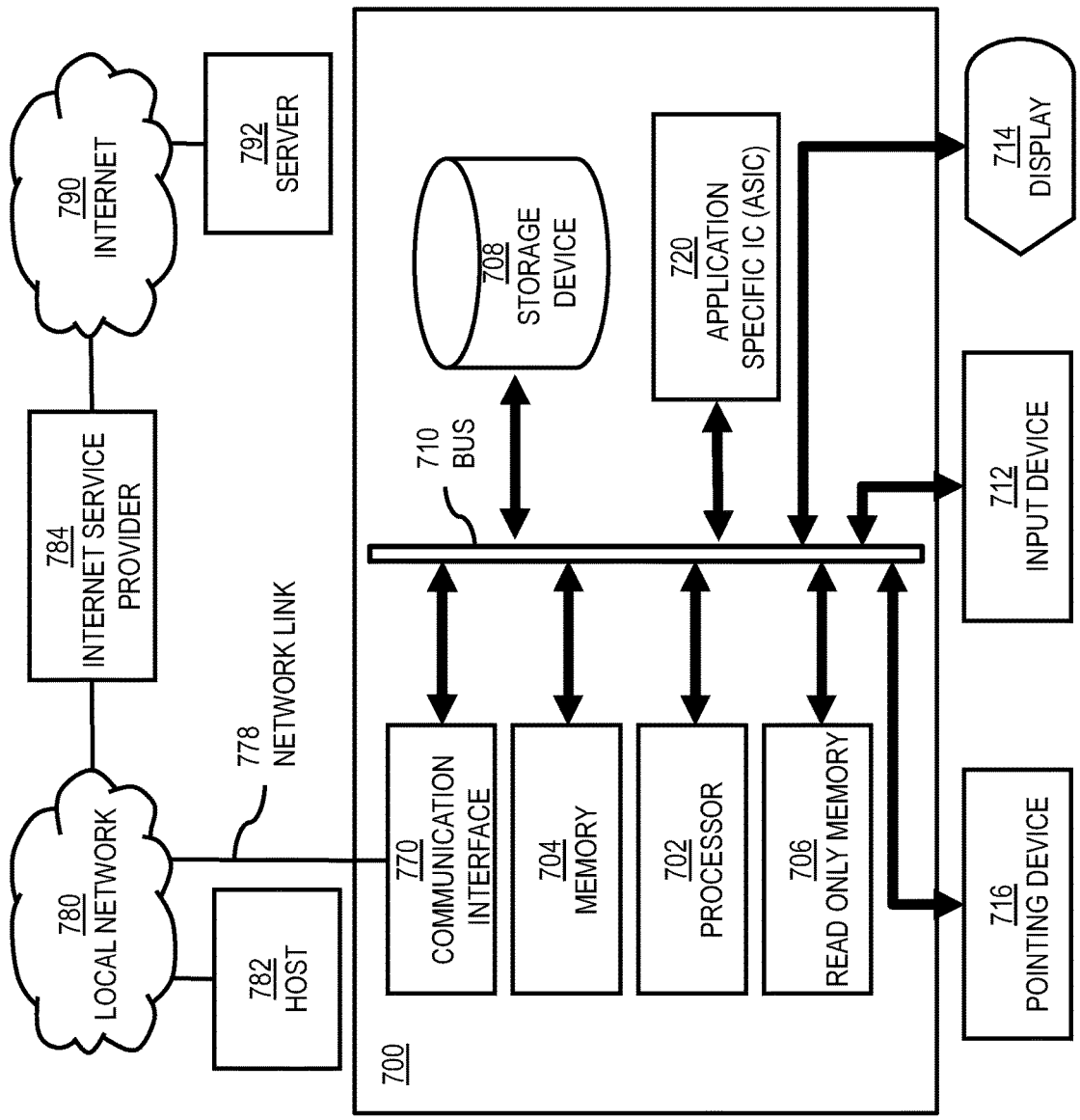
FIG. 7 is a diagram of hardware that can be used to implement an embodiment.

FIG. 7 illustrates a computer system 700 upon which an embodiment of the invention may be implemented. Computer system 700 is programmed (e.g., via computer program code or instructions) to provide speculative navigation routing in incomplete maps as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to providing speculative navigation routing in incomplete maps. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing speculative navigation routing in incomplete maps. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing speculative navigation routing in incomplete maps, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 115 for providing speculative navigation routing in incomplete maps.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 8 illustrates a chip set 800 upon which an embodiment of the invention may be implemented. Chip set 800 is programmed to provide speculative navigation routing in incomplete maps as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide speculative navigation routing in incomplete maps. The memory 805 also stores the data associated with or generated by the execution of the inventive steps.

Figure 9:
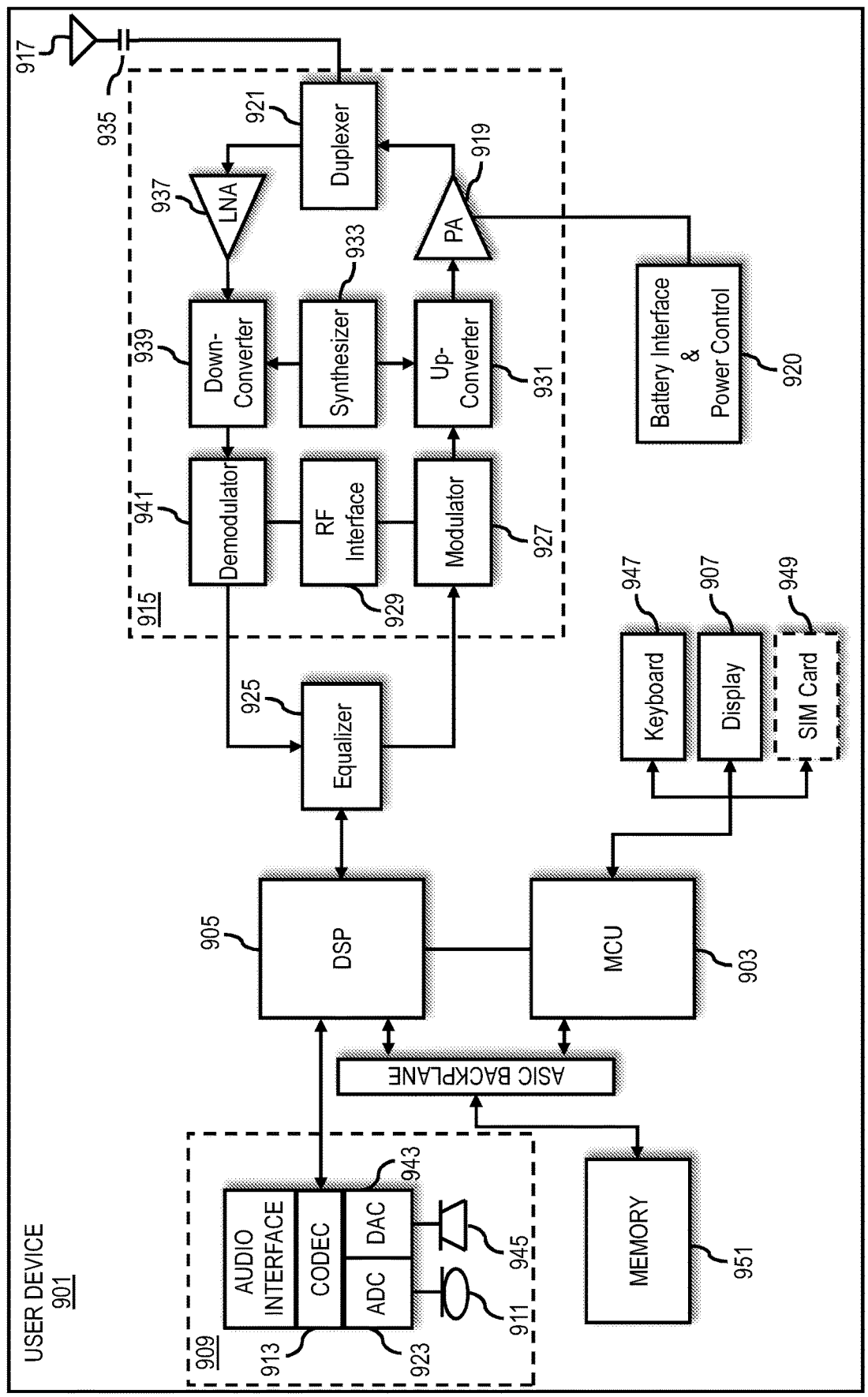
FIG. 9 is a diagram of a user device that can be used to implement an embodiment.

FIG. 9 is a diagram of exemplary components of a user device 103 or embedded device of a vehicle 101 capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and user device functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of user device 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the user device 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the user device 901 to provide speculative navigation routing in incomplete maps. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the user device 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the user device 901 on a radio network. The card 949 also contains a memory for storing a personal telephone number registry, text messages, and user specific user device settings.

What is claimed is:

1. A method comprising:
upon receiving an online navigation route to a destination, presenting at least a portion of the online navigation route on a user interface associated with a device;
in response to determining a disruption of the online navigation route reception at the device at a current location, (1) generating an offline navigation route by iteratively expanding from the current location to a next edge to get as close as possible to the destination in a timeout period by applying a modified A* algorithm on a directed graph constructed using offline map data cached at the device, and concurrently (2) transmitting a routing request from the device via a network to a routing server for a subsequent online navigation route from the current location to the destination, wherein the modified A* algorithm computes a cost of traversing an edge connecting first and second road segments as half of a time period of traversing the first road segment plus half of a time period of traversing the second road segment, wherein the offline map data is too incomplete to route from the current location to the destination, and the offline navigation route is a partial route for the destination due to the timeout period; and
at the end of the timeout period, providing the subsequent online navigation route and the offline navigation route on the user interface associated with the device, wherein the user interface is configured to display: (1) the subsequent online navigation route or a portion of the subsequent online navigation route based on determining that the subsequent online navigation route or the portion of the subsequent online navigation is received at the device within the timeout period, and (2) the offline navigation route or a portion of the offline navigation route, that is generated during the timeout period, based on determining that the subsequent online navigation route or the portion of the subsequent online navigation route is not received at the device before the timeout period ends, and regardless of accuracy of the offline navigation route or the portion of the offline navigation route.

2. The method of claim 1, wherein the offline map data was cached at the device in response to one or more prior routing requests, and the offline navigation route or the portion of the offline navigation route is provided on the user interface only after the timeout period.

3. The method of claim 1, wherein the offline navigation route includes a first offline maneuver from a location of the device when the timeout period begins,
- wherein the portion of the offline navigation route is the first offline maneuver that leads to a wrong direction for the destination, and
- wherein the portion of the subsequent online navigation route is a first online maneuver.

4. The method of claim 1,
- wherein the directed graph comprises a plurality of vertices representing a plurality of road segments stored in the offline map data, and a plurality of edges connecting the plurality of road segments where a navigation maneuver is possible, and
- wherein the modified A* algorithm computes a cost function of traversing a plurality of edges in the directed graph by aggregating the cost of traversing each edge.

5. The method of claim 4, further comprising:
- generating one or more candidate offline navigation routes based on the cost function during the timeout period; and
- selecting the offline navigation route from the one or more candidate offline navigation routes based on the respective cost function.

6. The method of claim 5, wherein the modified A* algorithm further computes a heuristic function that computes a distance from the edge to the destination and divides the distance by a maximum speed limit as a lower cost-bound of the heuristic function.

7. The method of claim 6, wherein the offline navigation route is selected further based on the respective heuristic function of the one or more candidate offline navigation routes.

8. The method of claim 1, wherein the timeout period, the providing of the subsequent online navigation route or the offline navigation route, or a combination thereof is applied on a maneuver-by-maneuver basis.

9. The method of claim 3, wherein the offline map data either has a data amount less than a data amount of the online navigation route or is a less current version of the online navigation route, and wherein the first offline maneuver is different from the first online maneuver.

10. The method of claim 1, wherein the offline map data includes a basic rendering map, a basic map-matching map, a plurality of previously used navigation routes, or a combination thereof.

11. An apparatus comprising:
- a processor; and
- a memory including computer program code for a program,
- the memory and the computer program code configured to, with the processor, cause the apparatus to perform at least the following,
  - upon receiving an online navigation route to a destination, present at least a portion of the online navigation route on a user interface associated with a device;
  - in response to determining a disruption of the online navigation route reception at the device at a current location, (1) generate an offline navigation route by iteratively expanding from the current location to a next edge to get as close as possible to the destination in a timeout period by applying a modified A* algorithm on a directed graph constructed using offline map data cached at the device, and concurrently (2) transmit a routing request from the device via a network to a routing server for a subsequent online navigation route from the current location to the destination, wherein the modified A* algorithm computes a cost of traversing an edge connecting first and second road segments as half of a time period of traversing the first road segment plus half of a time period of traversing the second road segment, wherein the offline map data is too incomplete to route from the current location to the destination, and the offline navigation route is a partial route for the destination due to the timeout period; and
  - at the end of the timeout period, provide the subsequent online navigation route and the offline navigation route on the user interface associated with the device, wherein the user interface is configured to display: (1) the subsequent online navigation route or a portion of the subsequent online navigation route based on determining that the subsequent online navigation route or the portion of the subsequent online navigation is received at the device within the timeout period, and (2) the offline navigation route or a portion of the offline navigation route, that is generated during the timeout period, based on determining that the subsequent online navigation route or the portion of the subsequent online navigation route is not received at the device before the timeout period ends, and regardless of accuracy of the offline navigation route or the portion of the offline navigation route.

12. The apparatus of claim 11, wherein the offline map data was cached at the device in response to one or more prior routing requests, and the offline navigation route or the portion of the offline navigation route is provided on the user interface only after the timeout period.

13. The apparatus of claim 11, wherein the offline navigation route includes a first offline maneuver from a location of the device when the timeout period begins,
- wherein the portion of the offline navigation route is the first offline maneuver that leads to a wrong direction for the destination, and
- wherein the portion of the subsequent online navigation route is a first online maneuver.

14. The apparatus of claim 11,
- wherein the directed graph comprises a plurality of vertices representing a plurality of road segments stored in the offline map data, and a plurality of edges connecting the plurality of road segments where a navigation maneuver is possible, and
- wherein the modified A* algorithm computes a cost function of traversing a plurality of edges in the directed graph by aggregating the cost of traversing an edge.

15. The apparatus of claim 14, wherein the apparatus is further caused to:
- generate one or more candidate offline navigation routes based on the cost function during the timeout period; and
- select the offline navigation route from the one or more candidate offline navigation routes based on the respective cost function.

16. A non-transitory computer-readable storage medium carrying one or more sequences of one or more instructions which, when executed by one or more processors, cause an apparatus to at least perform the following steps:

upon receiving an online navigation route to a destination, presenting at least a portion of the online navigation route on a user interface associated with a device;

in response to determining a disruption of the online navigation route reception at the device at a current location, (1) generating an offline navigation route by iteratively expanding from the current location to a next edge to get as close as possible to the destination in a timeout period by applying a modified A* algorithm on a directed graph constructed using offline map data cached at the device, and concurrently (2) transmitting a routing request from the device via a network to a routing server for a subsequent online navigation route from the current location to the destination, wherein the modified A* algorithm computes a cost of traversing an edge connecting first and second road segments as half of a time period of traversing the first road segment plus half of a time period of traversing the second road segment, wherein the offline map data is too incomplete to route from the current location to the destination, and the offline navigation route is a partial route for the destination due to the timeout period; and at the end of the timeout period, providing the subsequent online navigation route and the offline navigation route on the user interface associated with the device, wherein the user interface is configured to display: (1) the subsequent online navigation route or a portion of the subsequent online navigation route based on determining that the subsequent online navigation route or the portion of the subsequent online navigation is received at the device within the timeout period, and (2) the offline navigation route or a portion of the offline navigation route, that is generated during the timeout period, based on determining that the subsequent online navigation route or the portion of the subsequent online navigation route is not received at the device before the timeout period ends, and regardless of accuracy of the offline navigation route or the portion of the offline navigation route.

17. The non-transitory computer-readable storage medium of claim 16, wherein the offline map data was cached at the device in response to one or more prior routing requests, and the offline navigation route or the portion of the offline navigation route is provided on the user interface only after the timeout period.

18. The non-transitory computer-readable storage medium of claim 16, wherein the offline navigation route includes a first offline maneuver from a location of the device when the timeout period begins, wherein the portion of the offline navigation route is the first offline maneuver that leads to a wrong direction for the destination, and wherein the portion of the subsequent online navigation route is a first online maneuver.

19. The non-transitory computer-readable storage medium of claim 16, wherein the directed graph comprises a plurality of vertices representing a plurality of road segments stored in the offline map data, and a plurality of edges connecting the plurality of road segments where a navigation maneuver is possible, and wherein the modified A* algorithm computes a cost function of traversing a plurality of edges in the directed graph by aggregating the cost of traversing an edge.

20. The non-transitory computer-readable storage medium of claim 19, wherein the apparatus is caused to further perform:

generating one or more candidate offline navigation routes based on the cost function during the timeout period; and selecting the offline navigation route from the one or more candidate offline navigation routes based on the respective cost function.

* * * * *